3,661,961
REACTION PRODUCTS OF SILICON MONOXIDE AND ALIPHATIC HYDROCARBONS AND METHOD OF MAKING THE SAME

Erich T. Schaschel, Toledo, Ohio, assignor to Owens-Illinois, Inc.
No Drawing. Filed Mar. 3, 1970, Ser. No. 16,228
Int. Cl. C07f 7/08, 7/18
U.S. Cl. 260—448.2 H          15 Claims

ABSTRACT OF THE DISCLOSURE

An organo silicon polymer is prepared by the reaction of silicon monoxide and the C—H bond of an aliphatic hydrocarbon to provide a polymer that is useful as a lubricant, as an ingredient for a coating composition, as a stop-cock grease, and as a filler for ceramic and plastic compositions.

THE INVENTION

The present invention relates to the reaction products of silicon monoxide and aliphatic hydrocarbons in which the silicon monoxide by an insertion reaction inserts into the C—H bond of the hydrocarbon and to methods for preparing the reaction product.

It is an object of the present invention to provide a reaction product by reacting gaseous silicon monoxide in a vacuum with an aliphatic hydrocarbon such as n-octane to form a mixture, and condensing the mixture at a temperature of about −196° to about 100° C. to provide a reaction product that is an organo silicon polymer having a molecular chain containing

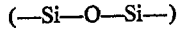

units.

It is an object of the present invention to provide an organo silicon polymer by reacting gaseous silicon monoxide and n-octane.

These and other object will be apparent from the specification that follows and the appended claims.

The present invention provides a reaction product of silicon monoxide and an aliphatic hydrocarbon such as n-octane generally in a one-step reaction to provide a new organo silicon polymer having a molecular chain containing (—Si—O—Si—) units.

The present invention also provides methods of making an insertion reaction product of silicon monoxide and an aliphatic hydrocarbons by bringing together gaseous silicon monoxide provided by heating solid silicon monoxide to about 1200° to 1300° C. in a vacuum generally between $1 \times 10^{-6}$ to $1 \times 10^{-2}$ torr and preferably between 1 to $5 \times 10^{-5}$ torr with the hydrocarbon, preferably in gaseous form, and condensing the mixture at about −196° to about 100° C. to obtain the reaction product. The reaction of silicon monoxide with the hydrocarbon apparently takes place on the cooled surface of a rotatable cylinder within the chamber, the temperature being generally about −196° to 100° C. and preferably about −196° to −70° C.

In general, the polymeric condensate is a solid, infusible material that is either insoluble in organic solvents or soluble in solvents such as benzene, acetone, dioxane, dimethyl formamiade, etc. The polymer has a high surface area and is hygroscopic. Thus, in general, the products are solid and infusible (they decompose very slowly and gradually at higher temperatures such as those above about 350° to 450° C.).

According to analytical data, SiO inserts into the C—H bond of the hydrocarbon along the lines of the following equation:

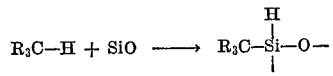

where R is a hydrogen atom or an aliphatic radical containing 1 to 12 carbon atoms such as methyl, ethyl, propyl, butyl, hexyl, octyl and decyl.

In general, the insertion reaction is in composition with the polymerization of SiO itself but can be promoted by a large molar excess of hydrocarbon to SiO. The transfer of monocoordinated silicon in the monomeric SiO to the tetra-coordinated silicon in the reaction product is accompanied by the formation of Si—O—Si bridges as well as sometimes Si—Si bridges. Hence, the polymer of the present invention can contain Si—Si bridges in addition to the Si—O—Si bridges.

Silicon monoxide can be obtained commercially (as, for instance, from Union Carbide Corporation) and can be prepared by reducing $SiO_2$ with Si, SiC, C, $H_2$, etc. at generally as high temperature. The reduction of $SiO_2$ with Si provides maximum yield and this process is generally preferred for preparing the silicon monxide, this process being characterized by its high reaction velocity and absence of secondary reactions that might possibly contaminate the final product. A detailed discussion of the nature and thermodynamic properties of solid silicon monoxide can be found in a monograph by N. A. Toropov, V. P. Barzakowskii, High Temp. Chemistry of Silicates and Other Oxide Systems, Izd. AN SSSR, Moscow, 1963. The disclosure of this publication is hereby incorporated by reference. The preparation of silicon monoxide is also disclosed in U.S. Pats. Nos. 2,882,177 and 2,823,979 which are also incorporated by reference.

The hydrocarbon compound such as n-octane is generally used in an excess amount on a molar basis compared to the silicon monoxide. Generally the molar ratio of the hydrocarbon to the silicon monoxide is in the range of as low as about 1 or 1.5:1 to as high as about 100 or 150:1 and preferably about 5:1 to 50:1. The optimum range of the molar ratio of hydrocarbon to silicon monoxide is about 15:1 to 25:1.

Although n-octane, n-hexane and n-decane are preferred hydrocarbons for use in the present invention, other aliphatic hydrocarbons are suitable such as propane, butane, pentane, neopentane, cyclopentane, cyclohexane, hexadecane, octadecane, eicosane and tetracosane.

The following eaxmple is intended to illustrate the present invention and not to limit the same in any way.

EXAMPLE

Gaseous silicon monoxide and gaseous n-octane were brought together and mixed within a chamber. The gaseous mixture was formed within the chamber at a pressure of 1 to $5 \times 10^{-5}$ torr using an excess amount of n-octane. The molar ratio of n-octane to silicon monoxide was 20:1. The gaseous mixture was condensed on the cooled walls of a rotatable cylinder located in the center of the chamber to form the reaction product. The solid reaction product formed from the reaction of silicon monoxide and n-octane was a white polymer with a molecular formula of $C_8H_{18}(SiO)_{10}$. The polymer was insoluble in organic solvents and infusible. The yield based on the silicon monoxide condensed onto the cold trap was 100%.

The polymer was used as a filler in ceramic and plastic compositions, and as a stop-cock grease.

In general, the polymers made by the present invention are infusible and mostly insoluble in organic solvents. Some of the soluble polymers were used as coating solutions to coat glass and plastic, wood and other materials as well as being used for films and self-supporting sheets. When used as a filler in ceramic and organopolysiloxane compositions, the polymer can be used in amounts of about 5 parts per 100 parts by weight of ceramic or organopolysiloxane.

What is claimed is:

1. A reaction product of one mole of silicon monoxide and about 1.5 to 150 moles of an aliphatic saturated hydrocarbon, the silicon monoxide and hydrocarbon being mixed at a pressure of about $1 \times 10^{-6}$ to $1 \times 10^{-2}$ torr to form a mixture that is condensed at about $-196°$ to $100°$ C. to provide the reaction product.

2. An organo silicon polymer having a molecular chain with (—Si—O—Si—) units prepared by the reaction of one mole of silicon monoxide and about 1.5 to 150 moles of an aliphatic saturated hydrocarbon, the silicon monoxide and hydrocarbon being mixed at a pressure of about $1 \times 10^{-6}$ to $1 \times 10^{-2}$ torr to form a mixture that is condensed at about $-196°$ to $100°$ C. to provide the reaction product.

3. A method of preparing an organo silicon polymer comprising reacting one mole of silicon monoxide with about 5 to 50 moles of an aliphatic saturated hydrocarbon having 1 to 24 carbon atoms, the silicon monoxide and hydrocarbon being mixed at a pressure of about $1 \times 10^{-6}$ to $1 \times 10^{-2}$ torr to form a mixture that is condensed at about $-196°$ to $100°$ C. to provide the reaction product.

4. A method of preparing an organo silicon polymer comprising the steps of mixing one mole of gaseous silicon monoxide and about 5 to 50 moles of an aliphatic saturated hydrocarbon having 1 to 12 carbon atoms at a pressure of about $1 \times 10^{-5}$ to $5 \times 10^{-5}$ torr to form a mixture, and condensing the mixture at about $-196°$ to $-70°$ C. to provide the organo silicon polymer that is the reaction product of silicon monoxide and a hydrocarbon.

5. A reaction product of 1 mole of silicon monoxide and about 1.5 to 150 moles of n-octane, the silicon monoxide and n-octane being mixed at a pressure of about $1 \times 10^{-6}$ to $1 \times 10^{-2}$ torr to form a mixture that is condensed at about $-196°$ to $100°$ C. to provide the reaction product.

6. A reaction product of about 1 mole of silicon monoxide and about 1.5 to 150 moles of n-octane.

7. A method for preparing an organo silicon polymer comprising the steps of mixing one mole of silicon monoxide at a pressure of about $1 \times 10^{-6}$ to $1 \times 10^{-2}$ torr with about 1.5 to 150 moles of n-hexane, to form a mixture, and condensing the mixture at a temperature of about $-196°$ to $100°$ C. to provide the organo silicon polymer.

8. A method for preparing an organo silicon polymer comprising the steps of mixing one mole of gaseous silicon monoxide at a pressure of about $1 \times 10^{-6}$ to $1 \times 10^{-2}$ torr with about 1.5 to 150 moles of a gaseous aliphatic saturated hydrocarbon having 6 to 10 carbon atoms to form a mixture, and condensing the mixture at a temperature of about $-196°$ to $100°$ C. to provide the organo silicon polymer.

9. A method as defined in claim 8 in which the hydrocarbon is n-octane.

10. A method of preparing an organo silicon polymer comprising the steps of heating the solid silicon monoxide to about $1200°$ to $1300°$ C. in a vacuum to form gaseous silicon monoxide, mixing gaseous silicon monoxide with a gaseous aliphatic saturated hydrocarbon having 1 to 12 carbon atoms in a vacuum to form a mixture, and condensing the mixture at a temperature of about $-196°$ to $100°$ C. to obtain the organo silicon polymer having a molecular chain containing (—Si—O—Si—) units.

11. A method as defined in claim 10 in which the vacuum has a pressure of about $1 \times 10^{-6}$ to $1 \times 10^{-2}$ torr and the condensing of the mixture is at a temperature of about $-196°$ to $-70°$ C.

12. A method as defined in claim 8 in which the pressure is at about $1 \times 10^{-5}$ to $5 \times 10^{-5}$ torr.

13. A reaction product as defined in claim 1 in which the hydrocarbon is n-hexane.

14. A reaction product as defined in claim 1 in which the hydrocarbon is n-decane.

15. A method as defined in claim 3 in which the hydrocarbon is n-decane.

No references cited.

TOBIAS E. LEVOW, Primary Examiner

P. F. SHAVER, Assistant Examiner

U.S. Cl. X.R.

117—124 F, 147; 252—49.6; 260—37.5 B, 46.5 R, 448.5 D, 448.5 E, 448.2 R, 448.8 R